March 20, 1934.   S. COHEN   1,951,925
VARIABLE CONDENSER
Original Filed March 16, 1932
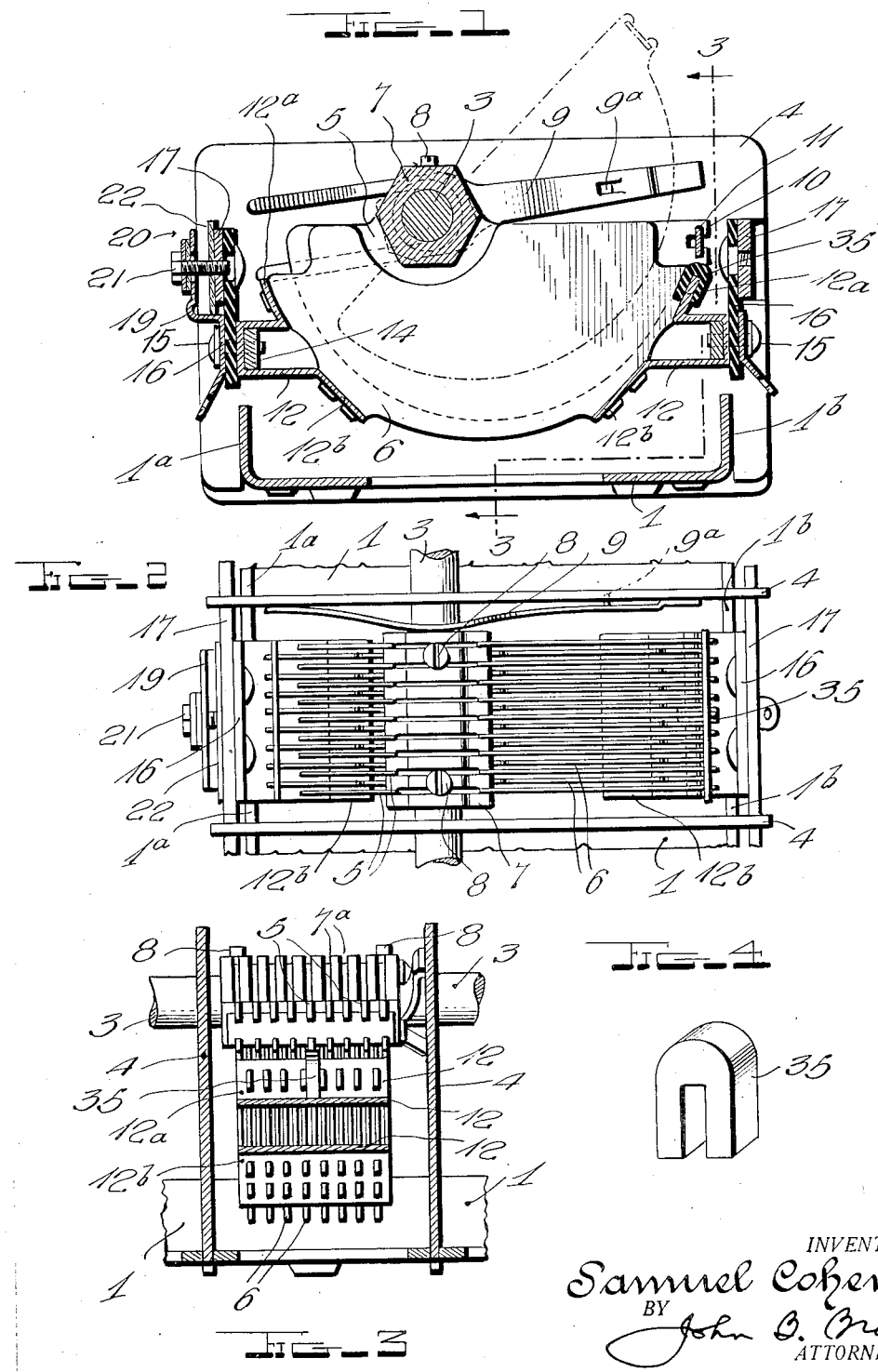
INVENTOR.
Samuel Cohen,
BY John O. Brady
ATTORNEY.

Patented Mar. 20, 1934

1,951,925

UNITED STATES PATENT OFFICE 1,951,925

VARIABLE CONDENSER

Samuel Cohen, Brooklyn, N. Y., assignor to General Instrument Corporation, New York, N. Y., a corporation of New York Original application March 16, 1932, Serial No. 599,241. Divided and this application July 6, 1933, Serial No. 679,227

5 Claims. (Cl. 175—41.5)

My invention relates broadly to variable electrical condensers and more particularly to a construction of insulated limiting stop for controlling the movement of the rotor plates of the variable condenser with respect to the stator plates with which the rotor plates are arranged to be interleaved.

This application is a division of my copending application, Serial No. 599,241, filed March 16, 1932, for Variable condenser.

One of the objects of my invention is to provide a construction of variable condenser in which an insulated stop is carried adjacent the stator plates for abutment with a member carried by the rotor plates for limiting the relative interleaving movement of the rotor plates with respect to the stator plates.

Another object of my invention is to provide a construction of insulated stop arranged to be carried by the stator plates of a variable condenser in alignment with a member carried by the rotor plates for limiting the movement of the rotor plates with respect to the stator plates during the interleaving operation of said plates.

Still another object of my invention is to provide a construction of insulated abutment which may be readily inserted upon the stator unit of a variable condenser for providing a limiting stop for a member carried by the rotor plates for preventing rotation of the rotor plates with respect to the stator plates beyond a range of 180°.

A further object of my invention is to provide a construction of insulated stop which may be readily applied to the stator unit of a variable condenser in the form of an insulated yoke which embraces opposite sides of one of the supports for the stator unit and projects beyond the peripheries of the stator plates to provide an abutment with a projection on the rotor plates for limiting the movement thereof in one of the extreme positions of said plates and preventing electrical contact between the key strip on the rotor plates and the peripheral edges of the stator plates.

Other and further objects of my invention reside in the construction of rotary variable condenser and limiting stop for determining the extent to which the rotor plates may be interleaved with respect to the stator plates as set forth more fully in the specification hereinafter following by reference to the accompanying drawing, in which:

Figure 1 is a cross-sectional view taken through a condenser showing the application of the insulated strip thereto; Fig. 2 is a plan view of one section of a condenser showing the insulated stop of my invention applied thereto; Fig. 3 is a cross-sectional view through the condenser section illustrated in Fig. 1 taken on line 3—3 thereof; and Fig. 4 is a perspective view of the insulated stop of my invention.

Referring to the drawing in more detail, reference character 1 designates the condenser chassis or cradle having upstanding side portions 1a and 1b. The cradle is provided with end plate members designated at 2 in which the rotor shaft 3 is journaled. Electrostatic shield plates 4 extend laterally of the condenser chassis and provide compartments within which the sections of the multiple variable condenser are arranged. Each section of the condenser includes a set of rotary plates 5 and a cooperating set of stator plates 6. The sets of rotor plates 5 are carried by the sleeve 7 located on the shaft 3 and is grooved as represented at 7a to receive the notched edges of the rotor plates 5 for securing the plates 5 in position for rotation in accordance with the movement of shaft 3. The sleeve 7 is secured in position on shaft 3 by means of set screw 8 which may be adjusted by means of a socket wrench or other tool. The sleeve 7 is subjected to frictional contact on the end thereof by means of resilient forked strip 9 which bears against the shield plate 4 at one side and against the end of sleeve 7 at the other side. The resilient forked strip 9 is secured with respect to the shield plate 4 by means of a lug 9a struck from the strip 9 and entering an aperture in the shield plate 4. The constant friction thus applied against the end of sleeve 7 enables the rotor shaft 3 to be moved with precision adjustment and maintained in any one of the positions to which the shaft is adjusted. The rotor plates 5 are keyed at one extremity thereof by means of a key strip 10 which engages oppositely disposed grooves 11 in the rotor plates 5. The key strip 10 has been shown disposed in a plane normal to the plane of the edges of the rotor plates 5.

The sets of plates 6 constituting the stator unit are supported from opposite ends thereof by means of channel shaped members 12 having oppositely extending angularly disposed portions 12a and 12b which serve as seats for lugs extending from the edges of the stator plates 6. These lugs have been designated at 6a and 6b extending through slots formed in the angularly disposed portions 12a and 12b of the channel shaped members 12, the lugs being upset to form a rigid connection between the stator plates 6 and the channel shaped supports 12. The channel shaped supports 12 each enclose a longitudinally extending member 14 which is screw threaded to receive the screw members 15 which pass through the lower portions of the insulated panels 16 which depend from the supporting frame members 17 which extend longitudinally of the condenser chassis. The suspension of the stator plates from the downwardly depending insulated panels 16 is such that the stator plates are centered within the condenser chassis and spaced away from the side walls thereof. A connecting lug 18 is secured under the head of one of the supporting screws 15 while the plate member 19 of the compensating condenser 20 is secured under the head of the opposite screw 15. The plate 19 is adjustable toward or away from the longitudinally extending frame member 17 by means of adjusting screw 21 which enters the frame member 17, passing through the dielectric sheet 22. Adjustment of the plate 19 toward or away from the longitudinally extending frame member 17 serves to adjust the capacity of the condensating condenser 20 in shunt with the stator and rotor plates constituting each condenser unit.

In order to prevent short-circuiting between the stator and rotor plates, I provide an insulated stop between the stator plates and the rotor plates. The stop consists of the yoke member 35 mounted directly over the angularly disposed edge 12a of the channel shaped member 12. As shown in Fig. 1, the insulated yoke 35 provides an abutment for key strip 10 on the rotor plates as the rotor plates are moved into interleaved relation with respect to the stator plates. As illustrated in Figs. 2, 3 and 4, the insulated yoke 35 is substantially U-shaped and has a width substantially equal to the space between two adjacent stator plates. The stop 35 is bifurcated and has the parallel extending portions thereof in contact with the opposite side walls of the plate constituting the channel shaped member 12. That is to say, the slotted portion of the insulator 35 embraces the edge of the supporting plate 12a and is maintained in position between adjacent stator plates of the stator unit. The insulated yoke serves to limit the movement of the rotor plates beyond a predetermined overlapping relationship.

I have found that the mounting of the insulated strip on selected parts of the stator plates provides an inexpensive and practical method of insulating the rotor plates with respect to the stator plates at the same time producing minimum dielectric losses.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. In a variable condenser, a set of stator plates, a set of rotor plates, means for variably interleaving said rotor plates with respect to said stator plates, a projection formed on said rotor plates, a key strip extending through said projection and maintaining said rotor plates in predetermined spaced relation, members extending normal to the opposite edges of said stator plates for supporting said stator plates, and a U-shaped insulator removably engaging the edge of one of said members for establishing an insulated abutment with the projection on said rotor plates for limiting the movement thereof in one of the extreme positions of said plates and preventing electrical contact between said key strip and said stator plates.

2. In a variable condenser, a set of stator plates, a set of rotor plates, means for variably interleaving said rotor plates with respect to said stator plates, a projection formed on said rotor plates, a key strip extending through said projection and maintaining said rotor plates in predetermined spaced relation, members extending normal to the opposite edges of said stator plates for supporting said stator plates, and an insulated member having portions thereof removably engageable on each side of one of the aforesaid members for providing an insulated abutment with the projection on said rotor plates for limiting the movement of said rotor plates in one of the extreme positions thereof and preventing electrical contact between said key strip and said stator plates.

3. In a variable condenser, a set of stator plates, a set of rotor plates, means for variably interleaving said rotor plates with respect to said stator plates, a projection formed on said rotor plates, a key strip extending through said projection and maintaining said rotor plates in predetermined spaced relation, members extending normal to the opposite edges of said stator plates for supporting said stator plates, and a bifurcated insulated member having parallel extending side portions removably engaging opposite sides of one of said members for providing an insulated abutment with the projection on said rotor plates for limiting the movement thereof in one of the extreme positions of said plates and preventing electrical contact between said key strip and said stator plates.

4. In a variable condenser, a set of stator plates, a set of rotor plates, means for variably interleaving said rotor plates with respect to said stator plates, a projection formed on said rotor plates, a key strip extending through said projection and maintaining said rotor plates in predetermined spaced relation, members extending normal to the opposite edges of said stator plates for supporting said stator plates, and a separable insulated yoke having opposite side portions removably engaging opposite sides of one of said members and having an end portion providing an insulated abutment with the projection on said rotor plates for limiting the movement thereof in one of the extreme positions of said plates and preventing electrical contact between said key strip and said stator plates.

5. In a variable condenser, a set of stator plates, a set of rotor plates, means for variably interleaving said rotor plates with respect to said stator plates, a projection formed on said rotor plates, a key strip extending through said projection and maintaining said rotor plates in predetermined spaced relation, members extending normal to the opposite edges of said stator plates for supporting said stator plates, and a separable insulator having a width substantially equal to the space between two adjacent stator plates, said insulator being slotted to removably engage the edge of one of said members for providing an insulated abutment with the projection on said rotor plates for limiting the movement thereof in one of the extreme positions of said plates and preventing electrical contact between said key strip and said stator plates.

SAMUEL COHEN.